United States Patent
Girondi

(10) Patent No.: US 10,874,963 B2
(45) Date of Patent: Dec. 29, 2020

(54) FILTER STRUCTURE FOR SEPARATION OF WATER FROM FLUIDS IN THE MOTOR VEHICLE SECTOR

(71) Applicant: UFI INNOVATION CENTER S.R.L., Ala (IT)

(72) Inventor: Giorgio Girondi, Mantova (IT)

(73) Assignee: UFI INNOVATION CENTER S.R.L., Ala (IT)

( * ) Notice: Subject to any disclaimer, the term of this patent is extended or adjusted under 35 U.S.C. 154(b) by 169 days.

(21) Appl. No.: 16/301,636

(22) PCT Filed: May 16, 2017

(86) PCT No.: PCT/IB2017/052875
§ 371 (c)(1),
(2) Date: Nov. 14, 2018

(87) PCT Pub. No.: WO2017/199168
PCT Pub. Date: Nov. 23, 2017

(65) Prior Publication Data
US 2019/0282940 A1    Sep. 19, 2019

(30) Foreign Application Priority Data
May 19, 2016  (IT) .................. 102016000051726

(51) Int. Cl.
*B01D 39/16*   (2006.01)

(52) U.S. Cl.
CPC .. *B01D 39/1623* (2013.01); *B01D 2239/0291* (2013.01); *B01D 2239/1208* (2013.01); *B01D 2239/1233* (2013.01)

(58) Field of Classification Search
CPC .............. B01D 35/005; B01D 39/1623; B01D 46/0036; B01D 46/546; B01D 2239/0291; B01D 2239/0404; B01D 2239/1208; B01D 2239/1233; A61L 15/60
See application file for complete search history.

(56) References Cited

U.S. PATENT DOCUMENTS

| 5,002,814 A * | 3/1991 | Knack .................... A61L 15/60 210/242.4 |
| 5,458,767 A | 10/1995 | Stone |
| 2009/0065436 A1* | 3/2009 | Kalayci .............. B01D 46/0036 210/679 |
| 2009/0114597 A1* | 5/2009 | Cronia ............... B01D 39/1623 210/660 |
| 2011/0056879 A1 | 3/2011 | Jacobs et al. |

FOREIGN PATENT DOCUMENTS

| EP | 0088533 A2 | 9/1983 |
| WO | 2008113021 A2 | 9/2008 |

* cited by examiner

*Primary Examiner* — Jason M Greene
(74) *Attorney, Agent, or Firm* — Volpe Koenig

(57) ABSTRACT

A filter structure (100) for separating water from a fluid, the filter (100) comprising an absorbent filter membrane (2) constituted by a non-woven textile (20), wherein the non-woven textile (20) is constituted by a bearing lattice (21) and by a super-absorbent material (22), which expands when it absorbs water, fixed to the bearing lattice (21), wherein the super-absorbent material (22) is present in a smaller quantity than 70% in dry weight with respect to a dry weight of the non-woven textile (20).

22 Claims, 4 Drawing Sheets

FILTER STRUCTURE FOR SEPARATION OF WATER FROM FLUIDS IN THE MOTOR VEHICLE SECTOR

TECHNICAL FIELD

The present invention relates to a filter structure for filtering fluids in the automobile sector, for example fuels or lubricants for supplying and/or lubricating internal combustion engines.

In greater detail, the invention relates to a filter structure able to eliminate the parts of water in suspension in the fluids which, upon reaching the mechanical organs of the water, create problems of oxidation and breakage thereof.

PRIOR ART

The problem of elimination of water from the fluids, such as the fuel or the lubricant, has been addressed over a long period, and is generally solved using filter structures provided with a plurality of filter membranes crossed in series by the fluid, of which a first filter membrane having a function of retaining the solid particles, a second membrane that has coalescent properties, and is able to agglomerate tiny particles of water present in suspension in the fuel into drops of a greater dimension, and a third membrane having hydrophobic properties, which retains the drops of water previously agglomerated and allows only the fuel to pass while conveying the water into a collecting environment, discharging it therefrom.

In some circumstances it is possible for the second membrane, instead of having coalescent properties, to have absorbent properties of the water molecules, in practice trapping the water internally thereof up to the condition of saturation, at which point it has to be removed. The filter structures do not usually have the third membrane with hydrophobic properties.

An example of these filter structures is described in U.S. Pat. No. 5,458,767. The filter structure includes a first filter membrane, suitable for treating the particulate, and a second filter membrane located downstream of the first filter membrane, which is made of a super-absorbent material, which absorbs the water present in the fluid being filtered and gradually expands its volume up to a condition of saturation, in which it is substantially impermeable to the fluid being filtered.

In these filter structures, in order to prevent the engine from seizing, a by-pass valve is present which, when the super-absorbent second filter membrane reaches the expanded saturated configuration, opens by effect of the pressure increase upstream of the second filter membrane and allows the fluid being filtered to flow out (with the water molecules possibly present) downstream of the second filter membrane until the second filter membrane is replaced with a new super-absorbent second filter membrane.

These known-type architectures, however, are not free of drawbacks, among which the fact that as a function of the quantity of water present in the fluid to be filtered, the second filter membrane can rapidly reach the saturation condition in the working fluid, also due to the fact that the dimensions of the super-absorbent second filter membrane cannot be unlimited and it is necessary, however, to take account, in the filtering environment, of the space required for expansion of the super-absorbent material.

Once the saturation condition has been reached in the working fluid, i.e. of the super-absorbent filter membrane immersed in the working fluid (oil or diesel fuel), no release of water by the super-absorbent filter is observed; in practice the water accumulation process (in the working fluid, i.e. the diesel fuel or oil) is not reversible, so it is necessary to proceed to replacement of the super-absorbent filter membrane once it is full of water.

Further, the presence of the by-pass valve, as well as incurring extra cost for the filter structure, as mentioned enables passage of fluid not separated from the water in the transitory step which goes from the moment of reaching the saturation condition of the super-absorbent material to the moment of replacement of the super-absorbent second filter membrane.

An aim of the present invention is to obviate the above-mentioned drawbacks of the prior art, with a solution that is simple, rational and relatively inexpensive.

The aims are attained by the characteristics of the invention as reported in the independent claim. The dependent claims delineate preferred and/or particularly advantageous aspects of the invention.

DESCRIPTION OF THE INVENTION

The invention in particular relates to a filter structure for separating water from a fluid, the filter comprising an absorbent filter membrane constituted by a non-woven textile, in which the non-woven textile is constituted by a bearing lattice and by a super-absorbent material, which expands when it absorbs water, and which is fixed (or interlaced) with the bearing lattice, wherein the super-absorbent material is present in a non-null quantity that is smaller than 70% and preferably comprised between 10% and 70% or between 30% and 70% in dry weight with respect to a dry weight of the non-woven textile.

With this solution, the bearing lattice is such as to mechanically support the super-absorbent material, including when the super-absorbent material is in a saturation configuration, i.e. it is saturated with absorbed fluid (water), and at the same time the solution enables having an absorbent filter membrane which, including in the saturation condition, enables being crossed by the fluid being filtered and therefore to continue being used even following reaching of the saturation level thereof.

In particular, once the saturation level has been reached the absorbent filter membrane, because of its bi-component structure (bearing lattice and super-absorbent material) in the above-described ratio, changes its behaviour from the absorbent behaviour to a quasi-coalescent behaviour in which it enables the agglomeration of the drops of water transported by the working fluid into larger dimension drops, with respect to those that continue to absorb from the upstream side thereof, and which are released downstream of the absorbent filter membrane with a dimension such as to make the separation and collection thereof easier.

It has further been observed that in the saturation condition the super-absorbent material is characterised by the formation of drops of water of much larger dimensions, including with respect to those which are obtained in outlet from traditional coalescent membranes.

Therefore, it has been observed that the efficiency of separation of the water and the duration of the absorbent filter membranes can be improved with respect to the prior art, as the use thereof is prolonged including after reaching the saturation configuration.

Further, the drops of water released (when in the saturation configuration) are so large, and are released in a non-turbulent way, that they can precipitate and therefore be effectively separated from the fuel/oil even without having necessarily (in some operating configurations) to have recourse to the use of hydrophobic barriers or separators located downstream of the absorbent filter membrane.

The super-absorbent material can advantageously be selected from a group consisting of polyacrylate, polyacrylamide and a functionalised synthetic material, for example polyester and/or a polyamide treated with molecules that confer on it the characteristic of super-absorbance.

In a preferred embodiment, the super-absorbent material can be constituted by fibres having an average diameter comprised between 10 μm and 40 μm in dry conditions and interlaced with the bearing lattice.

Alternatively or in addition, the super-absorbent material can be constituted by grains fixed to the bearing lattice.

The super-absorbent material, in a saturation configuration (having a maximum absorption capacity) has a volume comprised between 30 and 70 times the volume of the super-absorbent material in a dry configuration. For example the super-absorbent material can be operable between a dry or unsaturated configuration, in which the non-woven textile has an open porosity between the bearing lattice and the super-absorbent material, and a saturation configuration, in which the expansion of the super-absorbent material closes the open porosity between the bearing lattice and the super-absorbent material.

When the super-absorbent material is in saturation configuration, the non-woven textile preferably has a permeability to fluid that is not nil by capillarity at the interface between the bearing lattice and the super-absorbent material. With this solution, when the super-absorbent material is in the saturation configuration, even if the diesel fuel is allowed to pass beyond the barrier defined by the non-woven textile—via the pathway defined by the bearing lattice—the water passes through the absorbent filter membrane in the form of drops having a mean dimension that is increased with respect to the average dimension of the drops in inlet to the absorbent filter membrane, differently to what occurs in the solutions with the bypass valve.

Advantageously, the bearing lattice is made of a non-absorbent material (or poorly absorbent or at most adsorbent and in any case not super-absorbent), in a quantity such as to complete the 100% of the dry weight of the non-woven textile.

With this solution the bearing lattice is such as to be unaltered and to define a separation surface between the bearing lattice and the super-absorbent material, including when the super-absorbent material is in the configuration of saturation.

In a first embodiment, the bearing lattice can be made of a hydrophobic material, i.e. having a prevalently hydrophobic behaviour.

With this solution, the flow of fluid being filtered along the fibres of the bearing lattice is guaranteed and facilitated.

For example, the bearing lattice is made of a material selected from a group consisting of polyester (PE), polybutylene terephthalate (PBT), polyethylene terephthalate (PET), polypropylene (PP) or other polymers functionalised with silicone or polytetrafluorosilicone.

Alternatively or in addition, in a second embodiment the bearing lattice can be made of a hydrophilic material.

With this solution, the fibres of the bearing lattice also contribute to internally retaining, slowing and growing the drops of water present in the fluid being filtered which in any case runs along them.

For example, the bearing lattice is made of a material selected from a group consisting of polyamide, aliphatic polyamide, cellulose, rayon and acetate and regenerated cellulose.

The non-woven textile which constitutes the absorbent filter membrane preferably has a dry porosity of not lower than 85%, preferably not lower than 95%.

With this solution, in both the dry or non-saturation configuration and the saturation configuration of the super-absorbent material which constitutes the absorbent filter membrane, it is guaranteed that the condition is satisfied by which the pressure drop caused in the fluid (diesel or oil and water emulsion) in filtration by the second filter membrane is (very) much lower than the pressure drop caused in the same fluid being filtered by a filter membrane coupled to the absorbent filter membrane such as, for example, a filter membrane responsible for the filtration of the solid particulate (impurities) from the fluid.

For the same purposes, the non-woven textile which constitutes the absorbent filter membrane might have dimensions such as to have a dry thickness, in the fluid crossing direction, comprised between 0.3 mm and 30 mm.

The filter structure can advantageously comprise a first filter membrane able to filter the solid particulate (impurities) from the fluid, which is positioned upstream of the absorbent filter membrane in the crossing direction of the fluid.

Further, the first filter membrane has a water absorbency of less than 3-4 g/g. The first filter membrane 1 might advantageously have coalescent properties. The first filter membrane might be a depth filter membrane.

Alternatively or additionally, the filter structure can comprise a hydrophobic filter membrane positioned downstream of the absorbent filter membrane in the crossing direction of a fluid being filtered.

A further aspect of the invention relates to a filter cartridge for filtering a fluid containing water which comprises a support plate fixed to a filter structure, as described above, in which the absorbent filter membrane of the filter structure has a substantially toroidal shape and the support plate is fixed to one of the ends of the absorbent filter membrane.

In a still further aspect of the invention, a filter group is disclosed, comprising a casing provided with an inlet for a fluid to be filtered, a first outlet for the filtered fluid and a second outlet for water separated from the fluid being filtered, and a filter cartridge, as described above, wherein the coalescent filter membrane is able to separate the internal volume of the casing into two environments, of which a first environment in communication with the inlet and a second environment in communication with the second outlet.

BRIEF DESCRIPTION OF THE DRAWINGS

Further characteristics and advantages of the invention will emerge from a reading of the following description, provided by way of non-limiting example with the aid of the figures illustrated in the appended tables of drawings.

BEST WAY OF CARRYING OUT THE INVENTION

With particular reference to the figures, reference number 100 denotes in its entirety a filter structure for filtering liquids in the motor vehicle field, for example for filtration of fuel (especially diesel fuel) or lubricant (for example oil) and separation of the water present in the fluids.

For example the fluid being filtered might be composed of a first liquid (for example diesel fuel or oil), a second liquid mixable with the first liquid (for example water) and solid or semi-solid particulate dispersed in the first and the second liquids.

Figure 1:
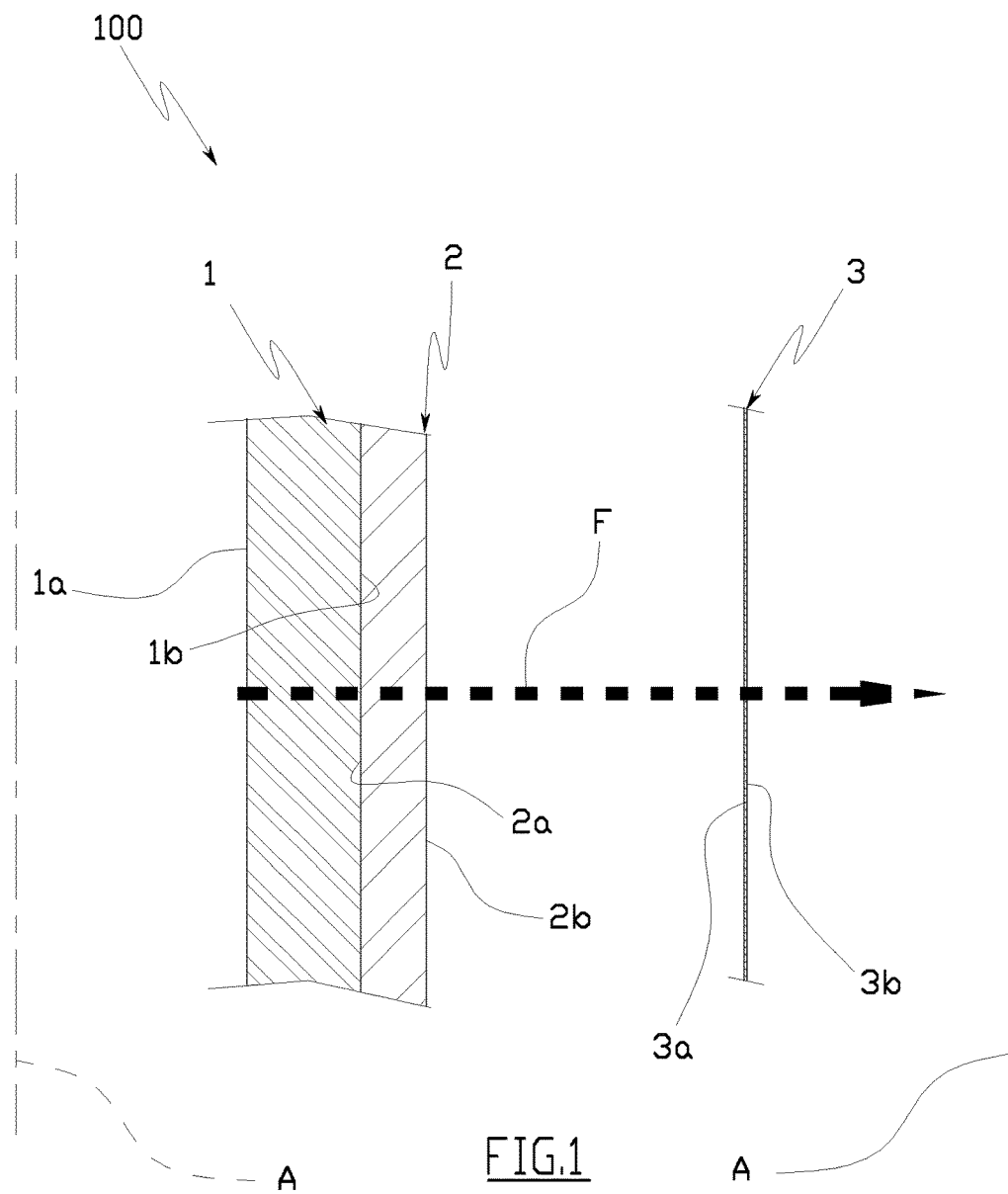
FIG. 1 is a section (vertical) view of a filter structure according to the invention.

FIG. 1 illustrates an embodiment of the filter structure 100.

The filter structure 100 comprises, for example, a first filter membrane 1 able to separate the solid particulate from the fluid being filtered.

The first filter membrane 1 comprises a layer of porous material.

For example, the porosity of the first filter membrane 1 is preferably comprised between 60% and 90%, preferably between 60% and 80%, where by porosity is meant the ratio between the overall volume of all the pores that are present in the filter membrane 1 and the total volume of the filter membrane 1 considered in its entirety.

The average dimension of the pores of the first filter membrane 1 is substantially lower than 10 µm, preferably lower than 7 µm. The average diameter of the fibres of the first filter membrane 1 can be comprised between 50 nm and 5 µm.

The first filter membrane 1 preferably has, overall, a water absorbency of lower than 3-4 grams of water for each gram of filter membrane 1 (g/g) measurable, for example, by using the EDANA WSP 10.1 standard.

For example, the first filter membrane 1 is made of a synthetic material, preferably a polyester, such as for example polyethylene terephthalate (PET) or polybutylene terephthalate (PBT), a nylon, such as for example PA6 or PA 6.6 or PA12, or polypropylene.

For example, the first filter membrane 1 is made of a non-woven textile of synthetic fibres, for example polyester (PET or PBT).

For example, the first filter membrane 1 is made of a semi-natural material such as cellulose, rayon or a material fashioned from cellulose such as, for example, lyocell.

Figure 1A:
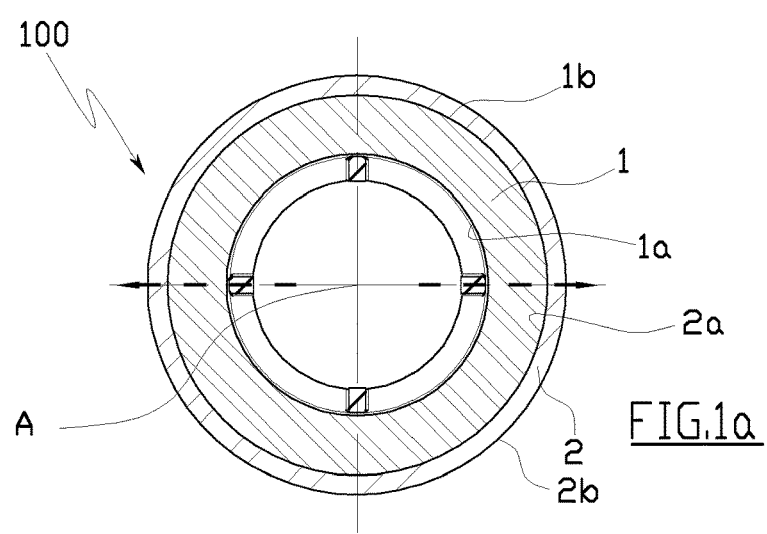
FIG. 1a illustrates a transversal section (horizontal) of a preferred embodiment of a filter structure according to the invention.

For example, the first filter membrane 1 might be a depth filter membrane, as shown in FIG. 1a.

For example the third filter membrane 1 can have a substantially toroidal shape exhibiting a longitudinal axis A (substantially central) and a transversal section that is substantially circular or star-shaped.

The first filter membrane 1 of the filter structure 100 can be crossed by a flow of a fluid being filtered (from outside or from inside according to constructional needs).

The first filter membrane 1 comprises a first face 1a turned upstream in the crossing direction F of the fluid being filtered and a second face 1b, opposite and for example parallel to the first face 1a, turned downstream in the crossing direction F of the fluid being filtered.

For example the longitudinal axis A of the first filter membrane 1 is arranged vertical or almost vertical in use.

For example, the first filter membrane 1 can have a thickness comprised between 0.5 mm and 20 mm, for example in the crossing direction (preferential) of the fluid being filtered F, or in any case defined by the distance between the first face 1a and the second face 1b of the first filter membrane 1.

The filter structure 100 in particular comprises an absorbent second filter membrane 2, able to be crossed by the fluid being filtered and to absorb the second liquid, i.e. water, present in the fluid being filtered.

The second filter membrane 2 can preferably be arranged downstream of the first filter membrane 1 in the crossing direction F of the fluid being filtered. The second filter membrane 2 is constituted by a non-woven textile (for example a layer of non-woven textile).

For example, the non-woven textile 20 is melt-blown or made by spun-bonding.

The second filter membrane 2 comprises a first face 2a turned upstream in the crossing direction F of the fluid being filtered and a second face 2b, opposite and for example parallel to the first face 2a, turned downstream in the crossing direction F of the fluid being filtered.

For example, the first face 2a of the second filter membrane 2, turned towards the first coalescent filter membrane 1, is at least partly in contact with the second face 1b of the first filter membrane 1.

Figure 6A:
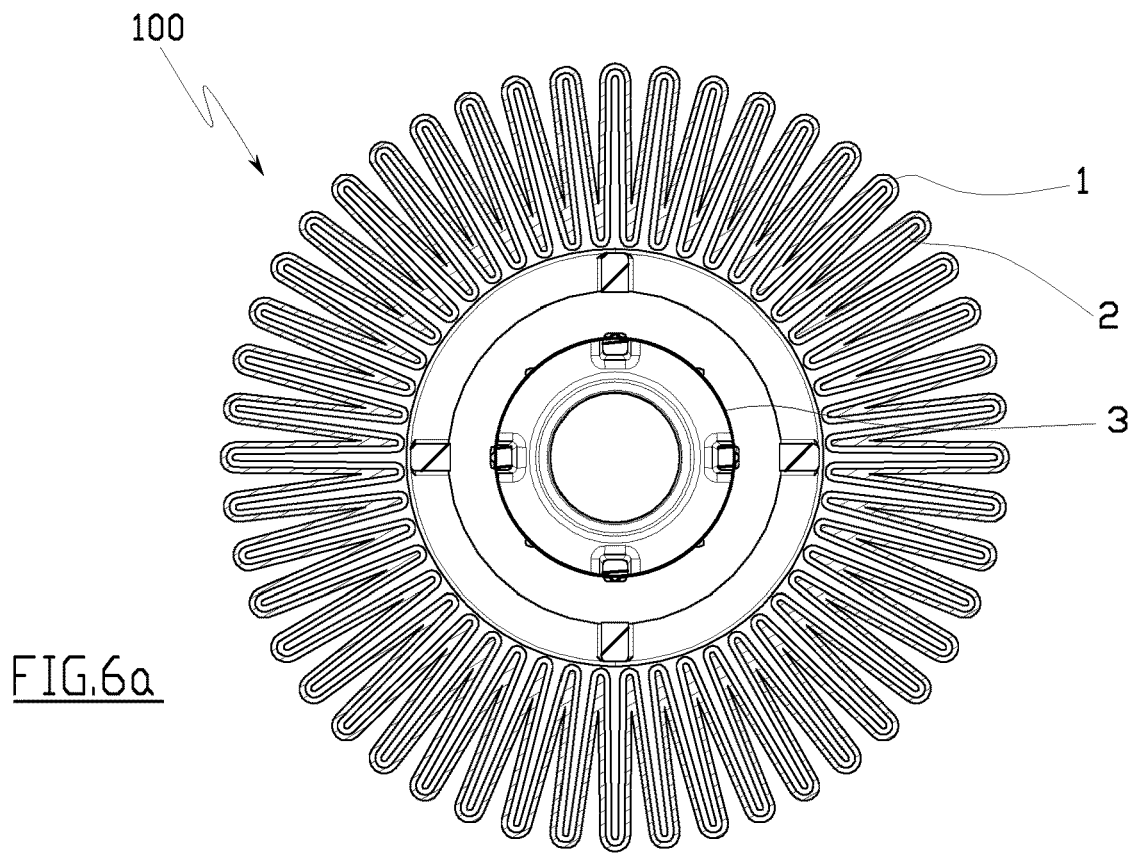
FIG. 6a is a section along line III-III of FIG. 2 of the filter structure according to a first embodiment.

For example, in the embodiment shown in FIG. 6a, the whole surface of the first face 2a of the second filter membrane 2, can be in contact with the second face 1b of the first filter membrane 1, for example in a case in which the first filter membrane 1 and the second filter membrane 2 have a transversal section (with respect to the longitudinal axis A thereof) that is substantially the same.

Figure 6B:
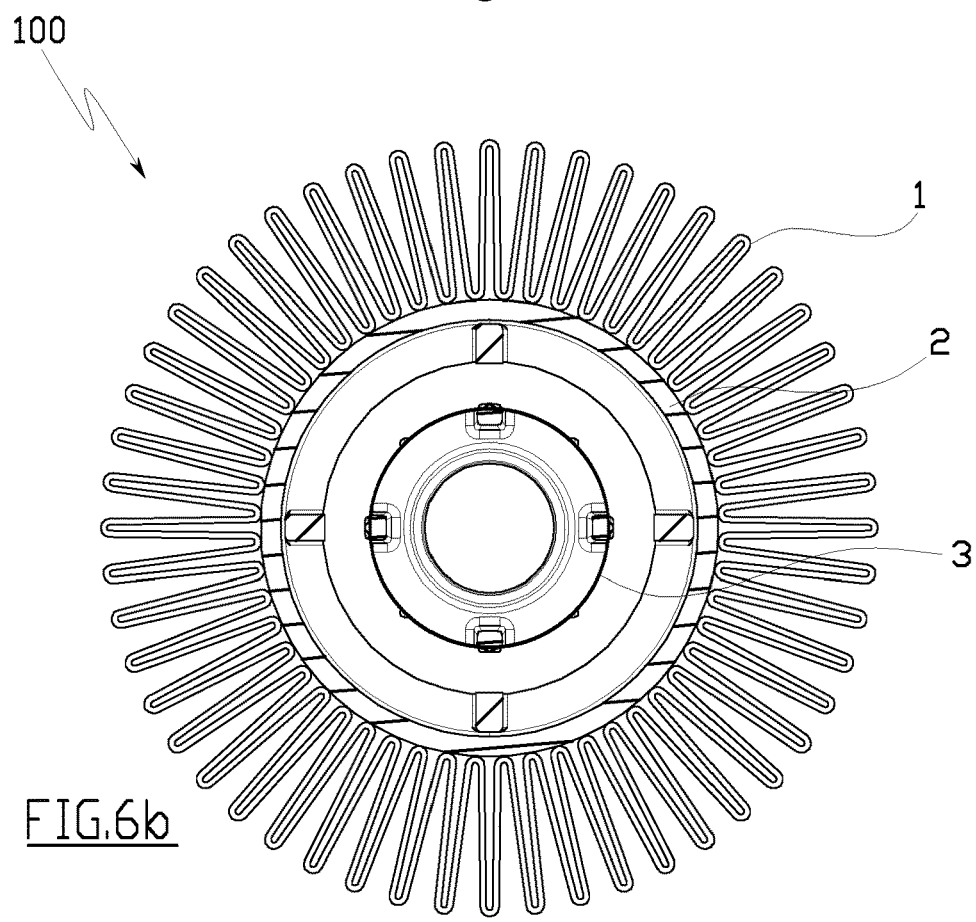
FIG. 6b is a section along line III-III of FIG. 2 of the filter structure according to a second embodiment.

It is however possible—as shown in the embodiment illustrated in FIG. 6b—for only a limited portion of the surface of the first face 2a of the second filter membrane 2 to be in contact with a limited portion of the first filter membrane 1, for example in a case in which the first filter membrane 1 and the second filter membrane 2 have a transversal section (with respect to the longitudinal axis A thereof) that are substantially different, for example one star-shaped and one circular.

In this latter case only the crests of the second face 1b of the star-shaped filter membrane (for example the first filter membrane 1) are in direct contact with respective strips (portions) of the first face 2a of the circular filter membrane (for example the second filter membrane 2).

It is further possible that in some circumstances the second filter membrane 2 can be not in contact with the first filter membrane 1; in this case the first face 2a of the second filter membrane 2, turned towards the first filter membrane 1, is at least partly separated from the second face 1b of the first filter membrane 1 through a gap (for example toroidal), for example empty. It is possible for the first filter membrane 1 and the second filter membrane 2 to be configured as two independent filter elements, aligned vertically or positioned flanked with respect to one another and crossed in series by the flow of the working fluid being filtered.

The non woven textile 20 is constituted by two components having different behaviours with respect to the second liquid, i.e. the water.

For example, the non-woven textile 20 è constituted by a bearing lattice 21 of fibre and a super-absorbent material 22 interlaced, or in any case fixed or welded, to the bearing lattice 21.

The fibres constituting the bearing lattice 21 are present in the non-woven textile 20 in quantities of not less than 30% in dry weight with respect to the dry weight of the non-woven textile 20

The fibres that constitute the bearing lattice 21 are made of at least a synthetic material, or a semi-natural material, which does not expand its volume (for example its volume does not expand significantly) in contact with water.

For example, the expansion volume of the fibres which constitute the bearing lattice 21 is not greater than 2-3 its dry volume.

The fibres that constitute the bearing lattice 21 are made of at least a synthetic material, or a semi-natural material, the water absorbance of which is less than 3-4 g/g.

The fibres that constitute the bearing lattice 21 are made of at least a not super-absorbent synthetic material, or a semi-natural material, (i.e. not absorbent or at most simply absorbent).

For example, the fibres that constitute the bearing lattice 21 have a curved longitudinal extension, for example substantially contorted, preferably in a random way.

The fibres that constitute the bearing lattice 21 can be, in use, deformed, for example stretched by traction and/or mechanical compression, for example maintaining the diameter thereof substantially unaltered.

In practice, the material of which the fibres are made that constitute the bearing lattice 21 does not create (if not to a very limited extent) chemical bonds with the water molecules, but only physical-type bonds (by surface interactions).

For example, the material of which the fibres are made that constitute the bearing lattice 21 has an energy in interaction (or bond) with the water molecules the intensity of which is not greater than 5 KJoule/mol.

The fibres that constitute the bearing lattice 21 (all or a percentage of not lower than 80% thereof), at least in the dry configuration, enable defining a pathway having at least an upstream end (in the crossing direction F of the fluid with respect to the second filter membrane 2), which is proximal to the first face 2a of the second filter membrane 2, i.e. which defines a portion of the first face 2a or emerges slightly with respect thereto, and a downstream end (in the crossing direction F of the fluid with respect to the second filter membrane 2), which is proximal to the second face 2b of the second filter membrane 2, i.e. which defines a portion of the second face 2b or emerges slightly therefrom.

In a first embodiment, the fibres constituting the bearing lattice 21 can have a prevalently (or totally) hydrophobic behaviour.

For example, the totality or a portion of the fibres which constitute the bearing lattice 21 are made of (constituted by) a hydrophobic material or clad with a hydrophobic material, or low wettability.

In this case, the fibres constituting the bearing lattice 21 can be present in the non-woven textile 20 in quantities of not less than 30% in dry weight with respect to the dry weight of the non-woven textile 20.

In practice, the fibres of hydrophobic material which constitute the bearing lattice 21 (overall) have a static contact angle $\theta_{st}$ greater than 90° (sexagesimal degrees), and an advancing contact angle $\theta_{av}$ comprised between 80° and 130° (sexagesimal degrees).

The fibres of hydrophobic material which constitute the bearing lattice 21 are preferably made of a polymer material, preferably a material selected from the group consisting of polyester (PE), polybutylene terephthalate (PBT), polyethylene terephthalate (PET), polypropylene (PP) or other polymers clad with hydrophobic material, for example with silicone or polytetrafluorosilicone, in which the cladding is obtained by a plasma functionalisation process.

Alternatively or in addition, in a second embodiment, the fibres constituting the bearing lattice 21 can have a prevalently (or totally) hydrophilic behaviour, i.e. able to adsorb the water molecules on the external surface thereof.

For example, the totality or a portion of the fibres which constitute the bearing lattice 21 are made of (constituted by) a hydrophilic material.

In this case, the fibres constituting the bearing lattice 21 can be present in the non-woven textile 20 in quantities of not less than 30% in dry weight with respect to the dry weight of the non-woven textile 20, for example in a lower percentage with respect to the case in which the fibres are made of a hydrophobic material.

In practice, the fibres of hydrophilic material that constitute the bearing lattice 21 (overall) have a static contact angle $\theta_{st}$ of less than 90° (sexagesimal degrees), and a receding contact angle $\theta_{av}$ of less than 50° (sexagesimal degrees).

The fibres of hydrophilic material that constitute the bearing lattice 21 are preferably made of a material selected from a group consisting of polyamide (PA 6 or PA 66), aliphatic polyamide, cellulose, rayon and acetate and regenerated cellulose.

It is possible that in a third embodiment, the bearing lattice 21 is constituted by two types of fibres, for example interlaced (or blended) with one another, of which a first type of fibre has a hydrophobic behaviour, as described above, and a second type of fibre has a hydrophilic behaviour, as described in the foregoing.

Further, the fibres constituting the bearing lattice 21 have an average diameter comprised between 10 μm and 40 μm.

The super-absorbent material 22 which constitutes the remaining part (as well as the bearing lattice 21 and 100% non-woven textile) of the non-woven textile 20 constitutes a quantity in dry weight with respect to the dry weight of the non-woven textile 20 that is not nil and not greater than 70% (dry weight/dry weight).

For example, when the bearing lattice 21 has a substantially hydrophobic behaviour (the totality or a portion of the fibres which constitute the bearing lattice 21 are made of (constituted by) a hydrophobic material or clad with a hydrophobic material, or low wettability, as described in the foregoing), the super-absorbent material 22 is present in the non-woven textile 20 in quantities comprised between 30% and 70% in dry weight with respect to the dry weight of the non-woven textile 20.

For example, when the bearing lattice 21 has a substantially hydrophilic behaviour (the totality or a portion of the fibres which constitute the bearing lattice 21 are made of (constituted by) a hydrophilic material or clad with a hydrophilic material, or low wettability, as described in the foregoing), the super-absorbent material 22 is present in the non-woven textile 20 in quantities comprised between 10% and 70% in dry weight with respect to the dry weight of the non-woven textile 20.

The super-absorbent material 22 is a polymer (synthetic) which expands (significantly) its volume by retaining internally thereof, for example by means of chemical bonds, the second fluid, i.e. the water.

For example, the expansion volume of the super-absorbent material 22 is not less than 20 times its own dry volume, preferably between 30 and 70 times its own dry volume.

The super-absorbent material 22 has a water absorption that is substantially greater than 200 g/g (grams of water/grams of dry super-absorbent material 22) for example substantially 300 g/g.

In practice, the super-absorbent material 22 creates chemical bonds (i.e. hydrogen bridges) with the water molecules, which are thus captured and bonded to the structure (internal) of the super-absorbent material 22. For example, the super-absorbent material 22 has a bonding energy with the water molecules the intensity of which is substantially comprised between not greater than 21 and 29 KJoule/mol.

The super-absorbent material 22 is preferably a polymer selected from the group consisting of polyacrylate, polyacrylamide and, for example, a polymer that, once functionalised, has super-absorbent characteristics.

For example, the super-absorbent material 22 which constitutes the non-woven textile 20 has the form of a plurality of volumes or discrete elements of super-absorbent material 22, for example interlaced with one another and/or interspaced with respect to one another.

In an embodiment, the super-absorbent material 22 present in the non-woven textile 20 can be constituted by a plurality of grains (for example spherical or of any shape, when in the dry configuration) which are fixed, for example by means of welding to, and for example are substantially interlaced with, the bearing lattice 21.

In a preferred embodiment, the super-absorbent material 22 is constituted by (has the shape of) a plurality of fibres.

For example, the fibres that constitute the super-absorbent material 22 (i.e. the super-absorbent material fibres 22) have a curved longitudinal extension, for example substantially contorted, preferably in a random way.

The fibres of super-absorbent material 22 are for example interlaced (and mixed [blended]), for example randomly or according to a predetermined pattern, with the fibres constituting the bearing lattice 21.

In fact, therefore, the non-woven textile 20 is made of a mat defined by the interlacing between the fibres of super-absorbent material 22 and the fibres (of non-super-absorbent material) of the bearing lattice 21.

The fibres of super-absorbent material have an average diameter comprised between 10 µm and 40 µm in dry conditions.

It is further possible for the super-absorbent material 22 of the non-woven textile to be constituted by a plurality of fibres as described above and a plurality of grains as described in the foregoing.

The non-woven textile 20 in its entirety (i.e. formed by the union of the bearing lattice 21 and the super-absorbent material 22, in grains or in fibres) has a dry thickness, in the fluid crossing direction F (i.e. defined by the distance between the first face 2a and the second face 2b of the second filter membrane 2), comprised between 0.3 mm and 30 mm.

Overall, the non-woven textile 20 which constitutes the second filter membrane 2 has a porosity (open) measured dry of not less than 85%, preferably not less than 95%, meaning, by porosity (open) the ratio between the overall volume of the empty volumes (pores) which are present in the non-woven textile 20 (in the dry configuration) and the total volume of the non-woven textile 20 considered in its entirety (again in dry configuration). The open porosity of the non-woven textile 20 is for example defined by empty volumes interposed between the fibres which constitute the bearing lattice 21 and the super-absorbent material 22 (and/or between the meshes of the bearing lattice 21 and between the interspaces between the volumes/discrete elements—i.e. the grains or the fibres—of super-absorbent material 22).

Therefore the super-absorbent material 22 (i.e. the fibres or grains of super-absorbent material 22), as they gradually expand when absorbing the second fluid (water) internally, increases its volume from a dry configuration, or unsaturated, in which the non-woven textile 20 in its entirety (i.e. formed by the interlacing between the bearing lattice 21 and the super-absorbent material 20) has a determined open porosity that is not nil, to a saturation configuration, in which the expansion of the super-absorbent material 22 closes (totally) the open porosity, as the expanded volume of the super-absorbent material goes to occupy the above-mentioned empty volumes, in fact forcedly pressing against the fibres of the bearing lattice 21.

In practice, the super-absorbent material 22 (i.e. the fibres or grains of super-absorbent material 22), as it gradually absorbs water and, especially, when it is in the saturation configuration, takes the form of a gel (hydrogel) which constitutes a barrier or substantially uniform membrane which incorporates the fibres of the bearing lattice 21, which for example remain unvaried (or slightly altered) in dimensions (volume) or at most are drawn and at least partially stretched by the super-absorbent material 22 as it expands.

Figures 2, 3:
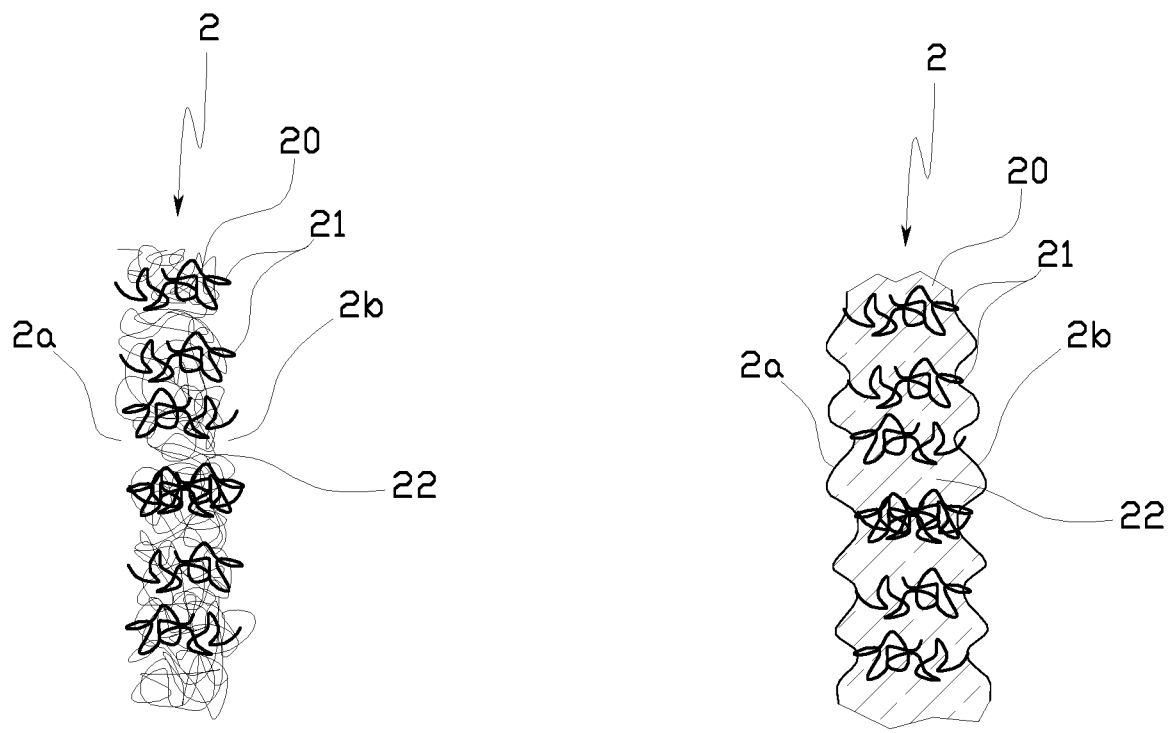
FIG. 2 is a section (vertical) view of a detail of an absorbent filter membrane in a dry or not saturated configuration of the filter structure according to the invention.
FIG. 3 shows the detail of FIG. 2 in a saturation configuration.
Figure 4:
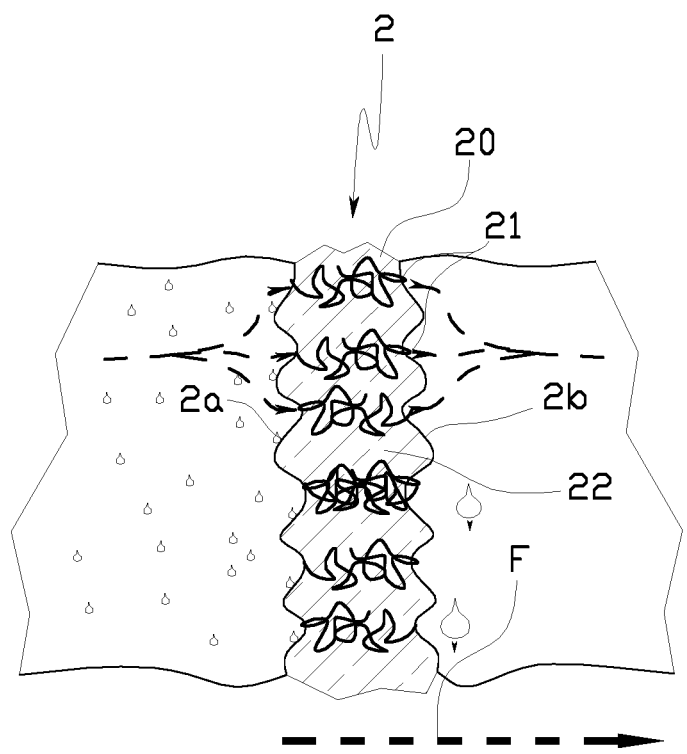
FIG. 4 is a schematic view of FIG. 2 in working conditions.
Figure 5:
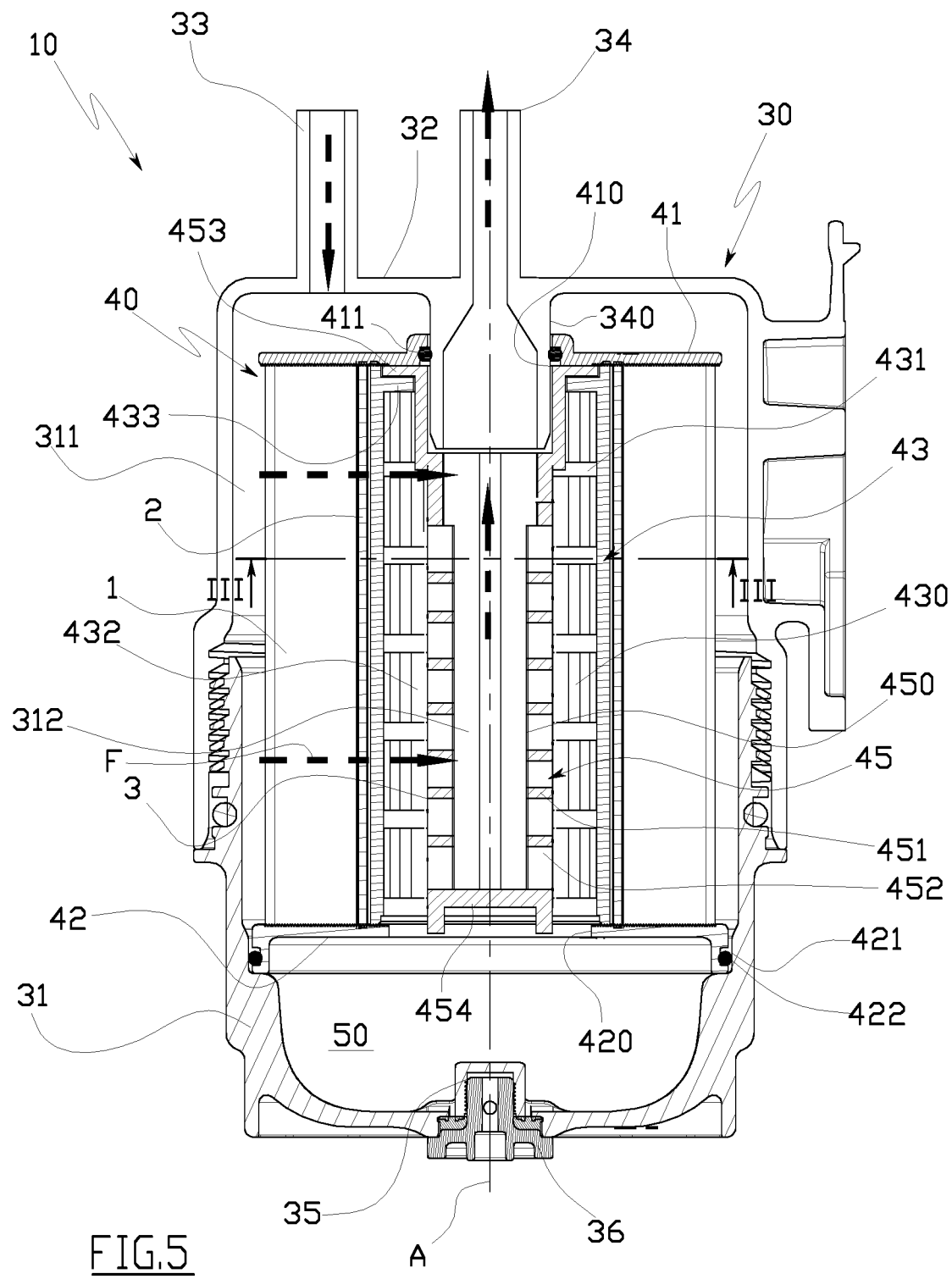
FIG. 5 is a section view of a filter group and a filter cartridge incorporating the filter structure according to the invention.

For example, as schematically illustrated in FIGS. 3 and 4, the (upstream and downstream ends of the) fibres that constitute the bearing lattice 21, including when the super-absorbent material 22 is expanded into its saturation configuration, continue to define a portion respectively of the first face 2a and the second face 2b or to emerge slightly with respect thereto or in any case be accessible from outside the barrier or membrane formed by the expanded super-absorbent material 22 in the saturation configuration.

When the super-absorbent material 22, i.e. the grains or fibres of super-absorbent material 22, is in the saturation configuration, i.e. forms the above-mentioned barrier or membrane which incorporates the fibres of the bearing lattice 21, the non-woven textile 20 overall, and therefore the second filter membrane 2, has a determined permeability to the fluid being filtered that is not nil.

This permeability is defined, for example by capillarity, at the interface between the fibres of the bearing lattice 21 and the super-absorbent material 22 in the saturation (expanded) configuration, i.e. between the fibres of the bearing lattice 21 and the surface of the barrier or membrane defined by the super-absorbent material 22 in the expanded saturation configuration which presses on (and is in contact with) the fibres of the bearing lattice 21. In practice, the fibres or grains of super-absorbent material 22 in the saturation configuration are fused together to define the above-mentioned barrier or membrane, which by itself would be substantially impermeable to the fluid being filtered, however the presence of the bearing lattice 21 incorporated in the barrier or membrane enables the non-woven textile 20 (and therefore the second filter membrane 20) to maintain a determined permeability to the fluid being filtered that is not nil (at least to the first fluid) through the fibres of the bearing lattice 21.

For example, as schematically illustrated in FIG. 4 by the dashed arrows having the greater thickness, the first fluid (for example the diesel fuel or oil) insinuates and flows along the pathway (curving) defined by the fibres of the bearing lattice 21, entering the first face 2a of the second filter membrane 2 (in the saturation configuration), for example flowing and insinuating itself into the channellings defined at the interface between the expanded super-absorbent material 22 and the fibres of the bearing lattice 21 and/or between the meshes and/or the irregularities of the fibres of the bearing lattice 21, and exiting from the second face 2b of the second filter membrane 2.

For example, the first fluid is directed preferentially to enter the second filter membrane 2 (in the saturation configuration) through the upstream ends of the pathway defined by the fibres of the bearing lattice 21 and exit, after having crossed the internal portion of the pathway defined by the fibres of the bearing lattice 21, from the downstream end of the pathway defined by the fibres of the bearing lattice 21.

The second filter membrane 2 can be dimensioned so that the pressure drop caused on the fluid being filtered (emulsion of first fluid and second fluid) by the second filter membrane 2 when the super-absorbent material 22, i.e. the grains or fibres of super-absorbent material 22, is in the saturation configuration is (much) smaller than the pressure drop caused by the fluid being filtered by the first filter membrane 1.

Further, the bearing lattice 21 of the non-woven textile 20 which constitutes the second filter membrane 2 and which remains substantially undeformed even in the saturation configuration of the super-absorbent material 22 enables the second filter membrane 2 to maintain a determined mechanical resistance, i.e. substantially to be self-supporting, including when the super-absorbent material 22 is in the saturation configuration, i.e. has a lower mechanical resistance to deformation.

In a case where the fibres of the bearing lattice 21 have a prevalently hydrophobic behaviour the fibres of the bearing lattice 21 tend to distance the drops of water from the fibres, which are pushed towards the super-absorbent material 22 in the saturation configuration.

In a case where the fibres of the bearing lattice 21 have a prevalently hydrophilic behaviour, the fibres of the bearing lattice 21 tend to accumulate and grow the drops of water, for example by surface interaction through physical bonds.

In any case, the particles or drops of the second fluid (water) of small dimensions present and dispersed in the first fluid (diesel fuel or oil) upstream of the second filter membrane 2, while the super-absorbent material 22 (i.e. the fibres or grains of super-absorbent material 22) is in the saturation configuration, are retained and absorbed by the super-absorbent material itself, and therefore do not pass downstream of the second filter membrane 2.

When the super-absorbent material 22 (i.e. the fibres or grains of super-absorbent material 22) reaches the saturation configuration, the particles or drops of the second liquid (water) of small dimensions present and dispersed in the first liquid (diesel fuel or oil) upstream of the second filter membrane 2 impact on the first face 2a thereof, i.e. on the first face defined largely by the barrier or membrane of super-absorbent material 22 in the saturation configuration (hydrogel), which, being in the saturation configuration, agglomerates and separates, by effect of the force of impact and/or the pressure of the fluid and/or the cohesion between the molecules of the water that is reached in the super-absorbent material 22, from the opposite second face 2b (i.e. downstream of the second filter membrane 2), drops of water in a smaller number than the number of drops that have impacted the first face 2a and having a greater volume than the volume of the single drop which has impacted against the first face 2a.

In any case, the quantity of water that enters the super-absorbent material 22 upstream of the second filter membrane 2 is substantially equal to or smaller than the quantity that overall exits downstream thereof (i.e. the super-absorbent material 22, once having reached the saturation configuration, is substantially in equilibrium in the saturation configuration).

In practice, overall, when the super-absorbent material 22 (i.e. the fibres or grains of super-absorbent material 22) reaches the saturation configuration, the second filter membrane 2 has a behaviour that is substantially coalescent, i.e. aggregates particles or molecules of water to release downstream thereof drops of increased dimension with respect to the drops that it receives from upstream.

In particular, the dimension of the drops of second fluid (water) that are released downstream of the second filter membrane 2, when the super-absorbent material 22 is in the saturation configuration, is a function (for example proportional) of the force or chemical bonding energy existing between the water molecules of water and the super-absorbent material 22, therefore the greater the force or bonding energy (chemical) the larger the dimension of the drops of second fluid (water) that are released downstream of the second filter membrane 2.

This phenomenon is due to the fact that the forces responsible for the detachment of the drops from the super-absorbent material 22 in the saturation configuration in the crossing direction of the second filter membrane 2 and/or the floating/precipitation force, depend on the dimension of the drop and must overcome the force of the chemical bond existing between the molecules of water and the super-absorbent material 22.

For example, the drops of second fluid (water) that are released downstream of the second filter membrane 2, when the super-absorbent material 22 is in the saturation configuration, can have a diameter of greater than 0.1 mm.

Drops of such dimensions, which among other things are released with a low degree of turbulence, i.e. in almost laminar fashion (as the thickness of the super-absorbent material 22 in the expanded configuration mitigates the force of impact of the fluid being filtered upstream of the second filter membrane 2) can be such as to precipitate naturally and in an unforced way in the first fluid, and in this way can be accumulated or removed, for example without the aid of physical separators.

Alternatively, the filter structure 100 can also comprise a separator, which is located downstream of the second filter membrane 2 in the crossing direction F of the fluid being filtered, and is able to separate and/or collect the water drops that have grown in size and have been released by the second filter membrane, when it is in the saturation configuration.

The separator might comprise a flow switcher and a collecting and decanting basin.

The separator can preferably comprise a third filter membrane 3 having a hydrophobic behaviour, which can be arranged downstream of the second filter membrane 2 in the crossing direction F of the fluid being filtered and is separated therefrom (i.e. not in contact therewith).

The third filter membrane 3 is configured so as to be crossed by the fluid being filtered and realise a barrier for the water drops that have agglomerated and have increased the volume thereof (and mass) at the movement of release by the second filter membrane 2 in the saturation configuration.

The third filter membrane 3 comprises a first face 3a turned upstream in the crossing direction F of the fluid being filtered and a second face 3b, opposite and for example parallel to the first face 3a, turned downstream in the crossing direction F of the fluid being filtered.

For example, the first face 3a of the third filter membrane 3, turned towards the second filter membrane 2, is separated (not in contact) at a predetermined and non-nil distance from the second face 2b of the second filter membrane 2.

This predetermined difference can preferably be comprised between 0.1 mm and 20 mm according to the applications.

The third filter membrane 3 comprises a layer of porous material.

The third filter membrane 3 has, overall, preferably a static contact angle $\theta_{st}$ of greater than 100° sexagesimal degrees.

For example the third filter membrane 3 is made of a synthetic material, for example a polyester, preferably polyethylene terephthalate (PET) clad with a hydrophobic material, for example a silicone or fluorinated material, such as polytetrafluoroethylene (PTFE), in which for example the cladding is obtained by a plasma functionalisation process.

For example, the third filter membrane 3 is made of a non-woven textile of synthetic fibres, for example polyethylene terephthalate (PET) clad with polytetrafluoroethylene (PFE).

For example, the third filter membrane 3 can have a thickness comprised between 0.05 mm and 0.2 mm.

For example the third filter membrane 3 can have a substantially toroidal shape exhibiting a longitudinal axis A (substantially central) and a transversal section that is substantially circular or, preferably, star-shaped (or any shape).

For example, the third filter membrane 3 might be associated coaxially to the second coalescent filter membrane 2.

For example the longitudinal axis A of the third filter membrane 3 is arranged vertical or almost vertical. In this way the drops of water that collect on the first face 3a of the third filter membrane 3 can fall by force of gravity towards the lower end of the third filter membrane 3 where they can be collected in a collecting ambient and removed from there.

It is possible for the third filter membrane 3 to have a substantially different shape from the toroidal, for example it could be substantially planar or curved and located substantially perpendicular to the longitudinal axis A of the second filter membrane 2 or parallel to the second face 2b of the second filter membrane 2 or variously inclined with respect thereto.

The filter structure 100 illustrated can be applied to any filter cartridge, which for example can comprise at least a support plate fixed to one of the ends of the second filter membrane 2 and/or the first filter membrane 1 and/or the third filter membrane 3, for example lying on a plane that is substantially perpendicular to the longitudinal axis A thereof.

For example, the support plate is fixed (for example by welding) to an axial end of the second filter membrane 2, containing it axially.

For example, the filter structure can have a support plate for each axial end of the filter structure 100.

The support plate is preferably fixed (glued or welded) to at least a portion of the bearing lattice 21 of the non-woven textile 20 which constitutes the second filter membrane.

For example, the filter cartridge (and therefore the filter structure 100 having tubular and/or toroidal/cylindrical structure with a circular or stellar section) can be crossed (radially) by the fluid flow from the outside towards the inside or equivalently from the inside towards the outside.

The filter cartridge might be inserted internally of a casing of a known filter group, so as to separate the fluid being filtered.

Purely by way of example, the filter structure 100 can be applied to a filter cartridge 40 destined, for example, to be used in a filter group 10, for filtration of fluids, in particular fuel for an internal combustion engine, as illustrated in FIG. 2.

The filter assembly 10 comprises an external casing, denoted in its entirety by 30, provided with an inlet conduit 33 for the fuel to be filtered and an outlet conduit 34 for the filtered fuel that has been separated from the water. In the illustrated embodiment the casing 30 comprises a cup-shaped body 31, and a cover 32 able to close the cup-shaped body 31, on which the inlet conduit 33 for the fuel filter and the outlet conduit 34, which is axial, for the filtered fuel are located.

The cup-shaped body 31 comprises, positioned at a bottom thereof, a discharge conduit 35 for the water that accumulates on the bottom of the cup-shaped body 31, provided with a closure cap 36.

The filter cartridge 40 is accommodated internally of the casing 30, which filter cartridge 40 divides the internal volume of the casing 30 into two distinct chambers 311, 312, of which a first chamber 311 for the fuel to be filtered (in the example external), in communication with the inlet conduit 33, and a second chamber 312 of the filtered fuel (in the example internal), in communication with the outlet conduit 34.

The filter cartridge 40 comprises an upper support plate 41 and a lower support plate 42 between which the previously-described filter structure 100 is (axially) located.

The upper support plate 41 is substantially disc-shaped and affords a central hole 410 centred on the longitudinal axis A of the filter cartridge 40.

The lower support plate 42 is also substantially disc-shaped and has a central hole 420 centred on the longitudinal axis A of the filter membrane 43. The central hole 410 of the upper support plate 41 inserts on a terminal internal end portion of the outlet conduit 34, with the interposing of a usual seal ring 411 fixed in a suitable seating at the central hole 410.

The lower support plate 42, instead, enters and rests on the bottom of a cylindrical annular seating 421 afforded in the vicinity of the bottom of the cup-shaped body 31 (at a distance therefrom) by interposing of a further seal ring 422.

In the present embodiment, the first filter wall 1 and the second filter wall 2 are realized as loop-closed pleated walls, i.e. exhibiting, in transversal section transversal to the longitudinal axis A (for example horizontal), a known star-shape, and overall have a substantially toroidal shape.

The first filter membrane 1 and the coalescing second filter membrane 2 of the filter structure 100 are inserted externally of a cylindrical core 43 that connects the upper support plate 41 and the lower support plate 42. The core 43 exhibits a cage-like structure of substantially tubular shape and a diameter substantially equal to (or slightly smaller than) the internal diameter of the absorbing second filter membrane 2.

In particular, the cage structure of the core 43 is constituted by a plurality of vertical uprights 430 (e.g. equidistant) which join a plurality of horizontal rings 431 (for example, equidistant) defining the openings 432 for the passage of the fluid.

The opposite ends of the longitudinal core 43 are both open and respectively fastened, for example by gluing or welding, to the facing internal faces of the upper support plate 41 and the lower support plate 42.

A second core 45 is housed internally of the core 43, coaxial to the first core and having a cage-like structure exhibiting a substantially tubular shape and a diameter that is smaller than the diameter of the core 43.

In particular, the cage structure of the second core 45 is constituted by a plurality of vertical uprights 450 (e.g. equidistant) which join a plurality of horizontal rings 451 (for example, equidistant) defining the openings 452 for the passage of the fluid.

The hydrophobic third filter membrane 3 of the filter structure 100 is inserted on the external surface of the second core 45.

In other embodiments of the invention, the third filter membrane 3 can be associated to the external or internal surface of the second core 45 with any technical solution of known type, for example by welding or gluing.

The upper end of the second core 45 is inserted into an internal prolongation 340 of the discharge conduit 34 and exhibits at an edge thereof a flange 453, a lower surface of which rests against an annular shelf 433 that branches internally from the first core 43. With this configuration, the flange 453 of the core is clamped between the annular shelf 433 and the upper plate 41. The lower end of the second core 45 is, instead, closed by a disc-shaped body 454 located at the central hole of the lower plate 42.

In the light of the foregoing, the operation of the filter assembly 10 and/or the filter structure 100 is as follows.

The fluid being filtered, thrust in pressure by a supply pump which for example supplies an internal combustion engine or a user of an internal combustion engine or the like, is pushed to cross first the first filter membrane 1, which—thanks to the low mean diameter of the pores—separates the solid particulate from the first fluid and the second fluid. In crossing the first filter membrane 1, the water particles are not retained by the first filter membrane.

Thereafter the fluid being filtered (i.e. the first fluid separated from the solid particulate and the second fluid) encounter the absorbent second filter membrane 2.

As long as the second filter membrane 2, i.e. the super-absorbent material 22 contained therein, is in any non-saturation or dry configuration, i.e. the level of the second fluid (i.e. water) absorbed by the super-absorbent material 22 is lower than the maximum level that can be absorbed by the super-absorbent material 22, the second fluid (water) present in the fluid being filtered is removed therefrom and absorbed by the super-absorbent material 22 present in the second filter membrane 2 during the crossing thereof by the fluid being filtered.

When the second filter membrane 2, i.e. the super-absorbent material 22 contained therein, is (reaches) in the saturation configuration, the fluid being filtered, in particular the first fluid separated from the particulate and from the second fluid, is forced to permeate and cross the second filter membrane 2 through and along the crossing pathway defined by the bearing lattice 21. The particles (drops) of second fluid (water) present in the fluid being filtered, on the other hand, are forced to impact or in any case to bond with the super-absorbent material 22 contained in the second filter membrane 2, for example prevalently with the first face 2a thereof, causing release, at the second face 2b (i.e. downstream of the second filter membrane 2) of an equal quantity of the second fluid (water) in drops of an increased dimension with respect to the drops received.

The drops of the second fluid (water) which exit and are released by the second filter membrane 2, i.e. the super-absorbent material 22 contained therein, have dimensions in the saturation configuration such as to be able to precipitate spontaneously into the collecting volume for that purpose, for example on the bottom of the beaker body 31.

Alternatively or additionally, the drops of the second fluid (water) thus agglomerated and increased in volume, can be effectively blocked by the third filter membrane 3 (where included), which instead can be crossed by the first fluid (fuel or oil) filtered and separated from the first fluid which can then be directed towards the outlet conduit 34.

The drops of the second fluid (water) blocked by the hydrophobic third filter membrane 3 fall by effect of gravity into a lower collecting chamber superiorly delimited by the lower plate 42, and from there are discharged through the discharge hole 35 or by appropriate suction means.

The invention as it is conceived is susceptible to numerous modifications and variants, all falling within the scope of the inventive concept.

Further, all the details can be replaced with other technically-equivalent elements.

In practice the materials used, as well as the contingent shapes and dimensions, can be any according to requirements, without forsaking the scope of protection of the following claims.

The invention claimed is:

1. A filter structure (100) for separating water from a fluid, the filter (100) comprising an absorbent filter membrane (2) constituted by a non-woven textile (20), wherein the absorbent filter membrane (2) comprises a first face (2a) turned upstream in a crossing direction (F) of the fluid being filtered and a second face (2b), opposite to the first face (2a) and turned downstream in the crossing direction (F) of the fluid being filtered, wherein the non-woven textile (20) is constituted by a bearing lattice (21) and by a super-absorbent material (22), which expands when it absorbs water, fixed to the bearing lattice (21), wherein the super-absorbent material (22) is present in a smaller quantity than 70% in dry weight with respect to a dry weight of the non-woven textile (20), and wherein the super-absorbent material (22) is operable between a dry or unsaturated configuration, in which the non-woven textile (20) has an open porosity between the bearing lattice (21) and the super-absorbent material (22), and a saturation configuration, in which the expansion of the super-absorbent material (22) closes the open porosity between the bearing lattice (21) and the super-absorbent material (22), characterized in that fibers that constitute the bearing lattice (21) define a pathway having at least an upstream end, in the crossing direction (F), which defines a portion of the first face (2a) or emerges with respect thereto both in dry or unsaturated configuration and in saturation configuration of the superabsorbent material (22), and a downstream end, in the crossing direction (F), which defines a portion of the second face (2b) or emerges therefrom both in dry or unsaturated configuration and in saturation configuration of the super-absorbent material (22) so that, when the super-absorbent material (22) is in saturation configuration, the non-woven textile (20) has a permeability to the fluid that is not nil by capillarity to the interface between the bearing lattice (21) and the super-absorbent material (22).

2. The filter structure (100) of claim 1, wherein the super-absorbent material (22) is selected from a group consisting of polyacrylate and polyacrylamide.

3. The filter structure (100) of claim 1, wherein the super-absorbent material (22) is constituted by fibers having an average diameter comprised between 10 µm and 40 µm in dry conditions and interlaced with the bearing lattice (21).

4. The filter structure (100) of claim 1, wherein the super-absorbent material (22) is constituted by grains fixed to the bearing lattice (21).

5. The filter structure (100) of any claim 1, wherein the super-absorbent material (22) in a saturation configuration has a volume comprised between 30 and 70 times the volume of the super-absorbent material (22) in a dry configuration.

6. The filter structure (100) of claim 1, wherein the bearing lattice (21) is made of a non-absorbent material, in a quantity such as to complete the 100% of the dry weight of the non-woven textile.

7. The filter structure (100) of claim 1, wherein the bearing lattice (21) is made of a hydrophobic material.

8. The filter structure (100) of claim 6, wherein the bearing lattice (21) is made of a material selected from a group consisting of polyester (PE), polybutylene terephthalate (PBT), polyethylene terephthalate (PET), polypropylene (PP) or other polymers functionalized with silicone or polytetrafluorosilicone.

9. The filter structure (100) of claim 1, wherein the bearing lattice (21) is made of a hydrophilic material.

10. The filter structure (100) of claim 6, wherein the bearing lattice (21) is made of a material selected from a group consisting of polyamide, aliphatic polyamide, cellulose, rayon and acetate.

11. The filter structure (100) according to claim 1, wherein the non-woven textile (20) which constitutes the absorbent filter membrane (2) has a dry porosity of not lower than 85%.

12. The filter structure (100) according to claim 1, wherein the non-woven textile (20) which constitutes the absorbent filter membrane (2) has a dry 30 porosity, in the fluid crossing direction, comprised between 0.3 mm and 30 mm.

13. The filter structure (100) of claim 1, wherein, when the super-absorbent material (22) is in saturation configuration, the absorbent filter membrane (2) has a substantially coalescent behavior in which the absorbent filter membrane (2) releases water drops from a downstream side of said absorbent filter membrane (2), in the fluid crossing direction, having larger dimensions with respect to the water drops contained in the fluid to be filtered reaching an upstream side of the absorbent filter membrane (2).

14. The filter structure (100) of claim 1, comprising a first filter membrane (1) positioned upstream of the absorbent filter membrane (2) in the crossing direction of the fluid.

15. The filter structure (100) of claim 14, wherein the absorbent filter membrane (2) is dimensioned in such a way that the pressure drop caused on the fluid under filtration, when the super-absorbent material (22) is in saturation configuration, is smaller than the pressure drop caused by the first filter membrane (1) on the same fluid under filtration.

16. The filter structure (100) of claim 15, wherein both the first filter membrane (1) and the absorbent filter membrane (2) have a substantially toroidal shape having a longitudinal axis (A) and respective cross-sections having shapes different from each other.

17. The filter structure (100) of claim 16, wherein the first filter membrane (1) has a star-shaped cross-section and the absorbent filter membrane (2) has a circular cross-section.

18. The filter structure (100) of claim 14, wherein the first filter membrane (1) is a depth filter membrane.

19. The filter structure (100) of claim 1, further comprising a hydrophobic filter membrane (3) positioned downstream of the coalescent absorbent filter membrane (2) in the crossing direction of a fluid being filtered.

20. A filter cartridge (40) for filtering a fluid containing water which comprises a support plate (41, 42) fixed to a filter structure (100) according to claim 1, wherein the absorbent filter membrane (2) of the filter structure (100) has a substantially toroidal shape and the support plate (41, 42) is fixed to one of the ends of the absorbent filter membrane (2).

21. A filter group (10) comprising a casing (30) provided with an inlet (33) for a fluid to be filtered, a first outlet (34) for the filtered fluid and a second output (35) for water separated from the fluid being filtered and a filter cartridge (40), according to claim 20, wherein the absorbent filter membrane (2) is able to separate the internal volume of the casing (30) into two environments, of which a first environment in communication with the inlet (33) and a second environment.

22. The filter structure (100) according to claim 1, wherein the non-woven textile (20) which constitutes the absorbent filter membrane (2) has a dry porosity of not lower than 95%.

* * * * *

UNITED STATES PATENT AND TRADEMARK OFFICE
CERTIFICATE OF CORRECTION

PATENT NO. : 10,874,963 B2  
APPLICATION NO. : 16/301636  
DATED : December 29, 2020  
INVENTOR(S) : Giorgio Girondi Page 1 of 1

It is certified that error appears in the above-identified patent and that said Letters Patent is hereby corrected as shown below:

In the Claims

In Claim 19, at Column 18, Line 22, after the word "the" and before the word "absorbent", delete the word "coalescent".

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*